United States Patent [19]

Sentendrey

[11] Patent Number: 5,486,408
[45] Date of Patent: Jan. 23, 1996

[54] LAMINATED FIRE RESISTANT SHEET MATERIAL

[75] Inventor: Joseph S. Sentendrey, Parma, Ohio

[73] Assignee: Rexam Industries Corp., Matthews, N.C.

[21] Appl. No.: 310,571

[22] Filed: Sep. 22, 1994

Related U.S. Application Data

[62] Division of Ser. No. 45,033, Apr. 7, 1993.
[51] Int. Cl.⁶ ..................................................... B32B 7/00
[52] U.S. Cl. .................... 428/220; 428/110; 428/111; 428/219; 428/247; 428/253; 428/284; 428/285; 428/423.1; 428/425.9; 428/920
[58] Field of Search ..................... 428/246, 247, 428/284, 285, 110, 111, 253, 423.1, 425.8, 921, 920, 219, 220, 425.9

[56] References Cited

U.S. PATENT DOCUMENTS

| | | | |
|---|---|---|---|
| 3,034,939 | 5/1962 | Newkirk et al. | 428/287 |
| 3,840,419 | 10/1974 | De Keyser et al. | 156/309 |
| 3,996,409 | 12/1976 | Holloway et al. | 428/432 |
| 4,092,202 | 5/1978 | Bergk et al. | 156/331 |
| 4,147,678 | 4/1979 | Mao et al. | 260/28.5 R |
| 4,185,046 | 1/1980 | Pengilly et al. | 525/444 |
| 4,224,376 | 9/1980 | Ishige et al. | 428/315 |
| 4,282,283 | 8/1981 | George et al. | 428/228 |
| 4,284,682 | 8/1981 | Tschirch et al. | 428/263 |
| 4,348,450 | 9/1982 | Shaw | 428/182 |
| 4,426,478 | 1/1984 | Noyes et al. | 524/361 |
| 4,451,317 | 5/1984 | Oizumi et al. | 156/307.3 |
| 4,505,768 | 3/1985 | Cooley | 156/153 |
| 4,726,868 | 2/1988 | Goel et al. | 156/307.3 |
| 4,727,107 | 2/1988 | McConnell et al. | 524/371 |
| 4,820,368 | 4/1989 | Markevka et al. | 156/307.3 |
| 4,833,182 | 5/1989 | Israel et al. | 524/14 |
| 4,876,308 | 10/1989 | Melby et al. | 524/780 |
| 4,961,377 | 10/1990 | Bando et al. | 101/128.21 |
| 5,102,937 | 4/1992 | Warren et al. | 524/261 |

FOREIGN PATENT DOCUMENTS

| | | |
|---|---|---|
| 238593 | 12/1959 | Australia . |
| 62-164779 | 7/1987 | Japan . |
| 2008278 | 1/1990 | Japan . |

*Primary Examiner*—James J. Bell
*Attorney, Agent, or Firm*—Bell, Seltzer, Park & Gibson

[57] ABSTRACT

An improved method of forming a laminated, fire resistant flexible sheet material, and the resulting laminate product are disclosed. The method comprises directing a second web of flexible material to overlie a first web of a flexible material in which the face of the first web is coated with an admixture of a substantially solvent-free adhesive and a fire retardant composition so that the adhesive in the admixture joins the webs together to form a fire retardant flexible laminate construction.

10 Claims, 2 Drawing Sheets

LAMINATED FIRE RESISTANT SHEET MATERIAL

This application is a divisional of application Ser. No. 08/045,033, filed Apr. 7, 1993, now pending.

FIELD OF THE INVENTION

The present invention relates to methods of laminating flexible web materials with an adhesive, and in particular relates to laminating flexible sheet material while incorporating a fire retardant composition to produce a laminated structure that is particularly useful in building construction.

BACKGROUND OF THE INVENTION

The present invention relates to laminated sheet materials that are used in the construction of various types of buildings. As is known to those familiar with such construction, sheet material is desirably used for insulation, moisture barriers, vapor barriers, and other related construction needs.

One method of providing these properties in a building is in the form of laminated structures which are made up of several types of sheets having different, selected properties. For example, by laminating a moisture barrier sheet such as a plastic or polymeric material to a metal foil, the resulting structure can serve as both an insulator and as a moisture barrier.

Such laminated sheet structures are particularly useful in certain types of buildings where the interior or exterior construction of the building may make the use of other sorts of materials uneconomical, difficult, or even impossible. For example, the increasingly popular metal buildings provide a relatively economical method of producing useful structures with ease of construction and at moderate cost. Although the metal framework, walls, and roofing of such buildings are structurally sound, they generally provide little or no thermal insulating properties, and similarly offer the opportunity for moisture or vapors to pass through the building at the joints between the various subparts. Thus, some form of vapor or moisture barrier and some form of insulation are generally required.

In particular, because moisture reduces the effective R-value of fiberglass insulation, a moisture barrier can help maintain the insulation's R-value by preventing moisture from reaching the fiberglass portion of a building's insulation structure.

Laminate sheet structures offer a useful solution to these problems. In particular, because the sheet material is flexible and thin, it is easily handled and applied to structures such as metal buildings that lack more conventional elements to provide the desired vapor and thermal properties. It will be understood, of course, that these laminates also provide similar advantages in other types of construction.

An additional property desired in most structures, including metal buildings, is that of fire resistance or suppression. There are a variety of commercially available fire retardant or suppressive chemical additives which can be incorporated in other materials and will prevent or retard the propagation of fire. It is desirable to incorporate such fire retardant or suppressant compositions into a laminate construction of the type described.

Manufacture of laminated structures is generally accomplished by joining running webs of sheet materials, usually fed from supply rolls, with an adhesive therebetween. A number of adhesives can be used, and those familiar with adhesive systems and materials such as plastic, paper, cloth, and foil, generally select a particular adhesive from those conventionally available to join the laminate structure.

In forming a laminate, however, a sufficient amount of adhesive must be incorporated to form and maintain the laminate structure. For the type of laminates described herein, relatively high coat weights of adhesive are required; e.g. 6–10 pounds per ream. Such coat weights, however, limit the type of coating equipment that can be used. For example, differential roll coaters are generally useful for lower coat weights—around 1–3 pounds per ream—but cannot normally be used to form the laminates required for building construction.

Similarly, in order to have a useful degree of fire retardancy, the laminate must incorporate a sufficient amount of the fire retardant composition. Because the fire retardant compositions are usually solids in pigment form, they are most usefully added to the laminate structure in a liquid admixture. Thus, methods of forming such laminates must include some technique for adding the fire retardant compositions in such fashion in the desired or necessary proportions.

Additionally, where the fire retardant compositions are added to the adhesive systems, more of the overall formulated adhesive is generally required in order to obtain polymer levels that will sustain satisfactory adhesion.

Conventional adhesive systems, however, also present a problem. Specifically, they incorporate the adhesive or its precursors in some sort of solvent, usually either water or an organic solvent, depending upon the particular adhesive. The presence of the solvent, however, causes certain difficulties.

If water is the solvent, the problems generally relate to drying; i.e. time, energy, and physical space must be allotted to the drying process. All of these, of course, reduce the overall efficiency or economic favorability of such a system.

Alternatively, if an organic compound is the solvent, all of the problems that water present remains, but with the additional problem that the organic solvent may present environmental issues (e.g. release of ozone), or be toxic or otherwise hazardous, and thus must be carefully controlled prior to its release, or in some cases, prevented from any release whatsoever. Furthermore, some solvents—and thus potentially some adhesive systems—are considered hazardous enough to be presently illegal, or contemplated as being legally unavailable in the future.

Finally, although solvent free adhesives are known, they are conventionally considered to have poor "green strength" (i.e. its resistance to peeling apart as initially formed is poor, even if its cured adhesion is good) and thus unsuitable for laminate construction.

Accordingly, there exists the need for a method of producing such laminate constructions using the most advantageous equipment, incorporating the required amounts of adhesive and fire retardant composition, and while still providing the requisite vapor barrier, moisture barrier, thermal insulation, and fire retardant characteristics, but without the use of water or organic solvents.

SUMMARY OF THE INVENTION

The invention provides an improved method of forming a laminated, fire resistant flexible sheet material for such purposes. The method comprises coating one face of a first web of flexible material with an admixture of a substantially solvent-free adhesive and a highly filled fire retardant composition, and then directing a second web of flexible material to overlie the admixture on the first web so that the adhesive in the admixture joins the webs together to form a fire retardant flexible laminate construction.

In another aspect, the invention comprises the resulting structure formed of a first web of a flexible moisture barrier or other similar material, a second web of a flexible material overlying the first web, and an admixture of the uncured substantially solvent free adhesive and a highly filled fire retardant composition between the first and second webs for adhesively joining the webs when the adhesive in the admixture is set and cured.

The foregoing and other aspects, advantages and features of the invention, and the manner in which the same are accomplished, will become more readily apparent upon consideration of the following detailed description of the invention taken in conjunction with the accompanying drawings, which illustrated preferred and exemplary embodiments, and wherein:

DETAILED DESCRIPTION

The present invention is an improved method of forming a laminated, fire resistant flexible sheet material. The method comprises coating one face of a first web of flexible material with an admixture of a substantially solvent free adhesive and a fire retardant composition. In a preferred embodiment, and as discussed further herein with respect to FIG. 1, the adhesive admixture is applied from a differential roll coater. The second step comprises directing a second web of flexible material to overlie the adhesive admixture on the first web so that the adhesive in the admixture joins the webs together to form a fire retardant flexible laminate construction. When one of the webs being laminated is a moisture barrier material, and the other is an insulator, the resulting product is a fire retardant, insulating, moisture barrier laminate that has wide ranging use in the building industry.

As used herein, the designation "substantially solvent free" refers to an adhesive that may be in liquid form, but that does not incorporate volatile solvents or water. As is known to those familiar with such materials, such adhesives can include thermoplastic synthetic adhesives in the hot melt form, i.e. waxes or copolymers in melt form, as well as other similar substantially solvent free adhesive systems. Such adhesives are also referred to as "100% solids" adhesives.

Thus, one of the unexpected advantages of the present invention is the successful incorporation of fire retardant composition into the laminate, using a solvent free adhesive, and its incorporation in significantly large amounts. In preferred embodiments of the invention, the adhesive and the fire retardant composition are admixed prior to being coated upon the first web. Preferably the fire retardant is present in the admixture in a ratio of 0.5:1 or higher by weight, based upon total adhesive, retardant:adhesive, with the most preferred ratios being between about 0.5:1 and 4:1, retardant:adhesive.

Preferably, the adhesive in the admixture comprises a polyurethane adhesive system, of which many variations are well known to those of skill in this art, and can be selected for use without undue experimentation. Presently, two-part polyester-isocyanate adhesives are most preferred. As is known to those familiar with these materials, appropriate mixtures of polyesters and isocyanates will react to form polyurethanes. Accordingly, the term "polyurethane adhesive"0 can be used to describe the polyester-isocyanate mixtures that form the polyurethane. As further known to those of skill in the art, polyurethanes are thermoplastic polymers that can be made thermosetting and that are produced by the condensation reaction of polyisocyanates and a hydroxyl-containing material such as the polyester. In particular, polyurethanes that are formed from polyisocyanates and polyesters produce polymers with good resistance to abrasion, weathering, and organic solvents, and in addition to adhesives, are useful as sealants, caulking agents, films and linings.

In the present invention both isocyanate-terminated polyesters and polyol-terminated polyesters have demonstrated satisfactory results.

In the preferred embodiments, the admixture of adhesive and fire retardant composition comprises an admixture of the adhesive, an organic halogen compound, and a synergistic inorganic oxide. Unlike fire extinguishing materials such as carbon dioxide and water, such fire retardant agents act indirectly in that they interfere with those reactions within a flame that lead to a sustained release of heat. The intended result is for the temperature of the system to drop below its ignition temperature. Alternatively, such fire retardants may remove sufficient oxygen to prevent the combustion process from continuing. In the most preferred embodiments, the halogen-synergistic inorganic oxide composition comprises a mixture of decabromodiphenyl oxide, $(C_6Br_5)_2O$, and antimony trioxide, $Sb_2O_3$.

It will be understood, however, by those familiar with fire retardants, that other appropriate compounds are available, and that the examples herein are illustrative rather than limiting of the invention.

Further to the preferred embodiments, the step of coating the first web with the adhesive admixture comprises applying the admixture to a web of metal foil, of which webs of aluminum foil are presently most preferred. It will be understood, however, that the admixture could be applied to either of the substrate webs. In turn, the step of directing a second web of flexible material comprises directing a web of a vapor or moisture barrier material such as polyester, polyvinyl chloride, polyethylene, or other similar polymers into contact with the adhesive coated metal foil. For many purposes low density polyethylene (LDPE) is preferred. Alternatively, and depending upon the properties of the desired laminate, at least one of the first or second webs can comprise a textile material which can be woven, non-woven or knitted, and either synthetic or natural fiber, or some combination, depending upon the desired end use. The respective properties of various fabrics and fibers are well known to those of skill in the art and can be selected for appropriate purposes as desired.

In yet another embodiment, the method of the invention further comprises the step of incorporating a reinforcing material between the first and second webs of flexible material, and a preferred material is fiberglass which is most preferably incorporated in the form of a scrim between the first and second web of flexible material.

As advantages of the present invention, the substantially solvent free adhesive system eliminates drying or solvent removal steps from the overall laminate manufacturing process, lowers waste disposal (particularly control of volatile species that may be environmentally regulated), reduces the number of steps required to produce the laminate, and increases productivity by permitting manufacture at a generally higher rate than is the case with conventional water of solvent based adhesive systems.

Figure 1:
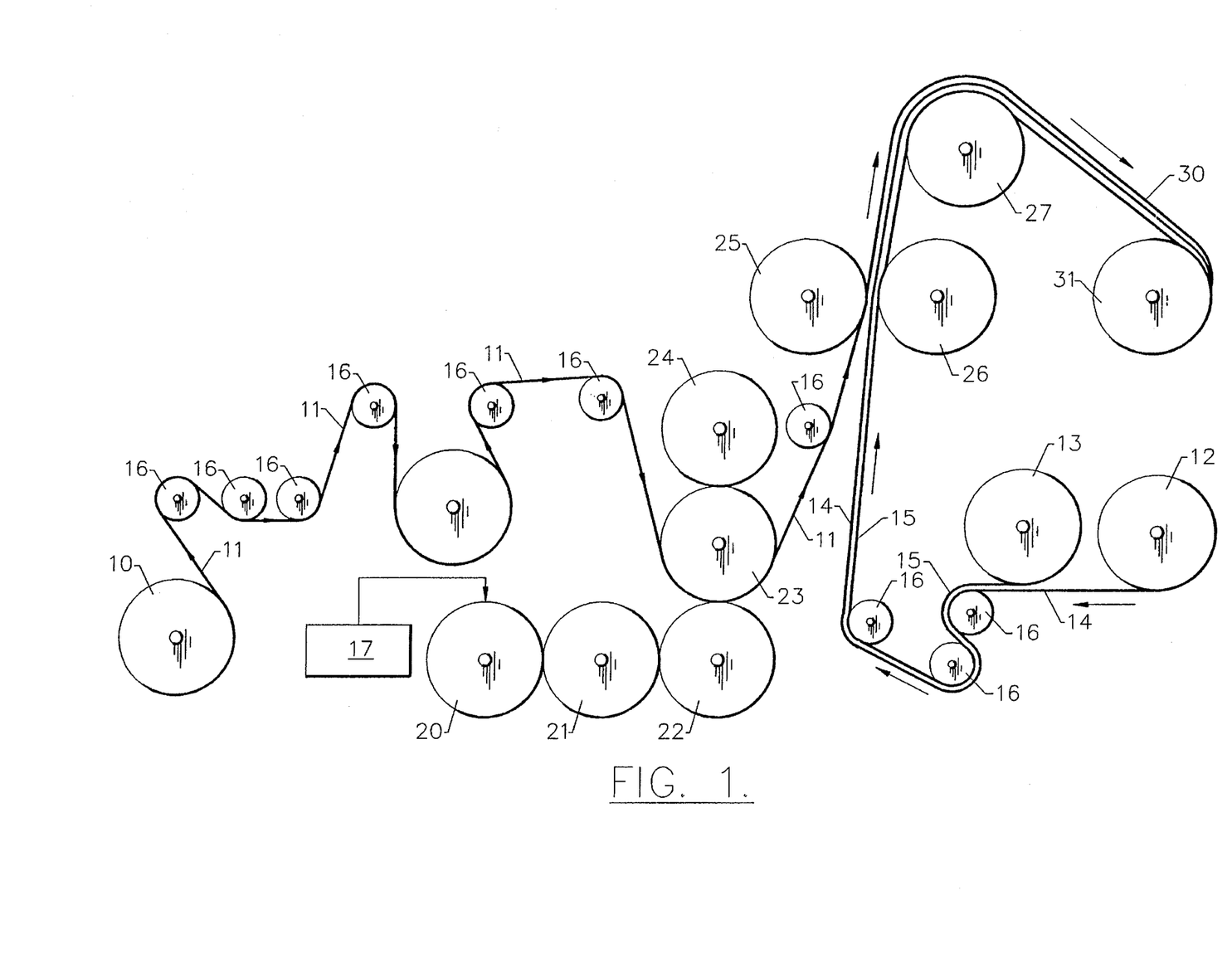
FIG. 1 is a schematic view of representative process and associated equipment for forming a laminate according to the present invention.

The invention can be further understood with respect to the accompanying drawings. FIG. 1 schematically illustrates a solventless laminator. A supply roll 10 feeds one of the web materials, for example low density polyethylene 11. A supply roll 12 feeds fiberglass scrim such as a 4×4 scrim (four warp yarns and four filling yarns per inch), and another roll 13 feeds a metal foil such as 0.33 mil (1 mil=0.001 inch) aluminum. In FIG. 1, the fiberglass scrim is designated at 14 and the aluminum foil at 15.

A series of idler rolls, each designated at 16, help direct the LDPE 11, the scrim 14 and the aluminum foil 15 throughout the coating and laminating process. It will be understood by those familiar with the control of advancing films that these various rollers can be placed in a number of arrangements, and that FIG. 1 simply illustrates one such arrangement for purposes of describing the invention.

As illustrated in FIG. 1, a source of the admixture 17 of adhesive and fire retardant is used to first direct the adhesive onto a differential roll coater which is schematically shown by the rollers 20, 21, 22, and 23. The rolls 20 and 24 are preferably formed of steel, the rolls 21 and 23 of rubber, and the roll 22 of a ceramic. The nature of the differential roll coater is such that when the admixture is applied to the roll 20, the combination of the steel, rubber and ceramic rollers spreads the admixture easily in a constant coat weight onto the web that is directed, as illustrated in FIG. 1, between the ceramic roll 22 and the rubber roll 23. In an alternative arrangement, the admixture can be added between the rolls 20 and 21, which are referred to as the "gate rolls."

As set forth earlier herein, two of the unexpected advantages of the invention are first, the degree to which a large amount of fire retardant composition can be successfully included in the admixture and applied in satisfactory fashion from a roller system such as the differential roll coater; and second, the relatively high coat weights that can be applied to the web as the laminate is formed. In particular, the admixture is applied in coat weights of between about 2 and 30 pounds per ream (one ream equals 3,000 square feet), and most preferably in coat weights of between about 5 and 15 pounds per ream.

With respect to such coat weights, laminates such as those of the present invention generally require adhesive coat weights in the range of 6–10 pounds per ream (#/R). Differential roll coaters, however, can generally only provide coat weights of 1–3 pounds per ream.

Thus, the invention provides the advantage of use of a differential roll coater to obtain unexpectedly high coat weights.

Further to the preferred embodiments, and as set forth earlier, the fire retardant compositions are halogensynergistic inorganic oxides and the adhesive portion of the admixture is a two-part adhesive. As used herein, the designation "two part adhesive" refers to the use of two separate reactive components, such as isocyanate and polyester-polyol precursors, that react to form the adhesive. As is known to those familiar with urethane adhesives, they are also available as one-part urethane prepolymers that are set by heat, exposure to ambient atmosphere, or certain other conditions.

Following the application of the adhesive coating in the differential roll coater illustrated in FIG. 1, the LDPE 11 is directed across one of the idler rolls and brought together with the aluminum foil 15 and the fiberglass scrim 14 at the nip rolls 25 and 26. In the illustrated embodiment the roll 25 is formed of rubber and the roll 26 of steel, but these are illustrative examples rather than limiting ones.

After the webs are brought together at the nip rolls 25 and 26, they are preferably passed over a chill roll 27 which helps to set the adhesive, and then advances, in the form of a laminate designated as 30 to a takeup roll 31.

In another aspect, the invention comprises the fire retardant laminate structure formed of a first web of a flexible moisture barrier material, a second web of flexible material overlying the first web, and an admixture of a substantially solvent free adhesive and a fire retardant composition between the first and second webs for adhesively joining the webs when the adhesive mixture is set. Referring to FIG. 1, the laminate 30 between the chill roll 27 and the takeup roll 31 would encompass such a structure.

As set forth with respect to the process, the fire retardant composition is preferably present in a ratio of 0.5:1 or higher by weight, retardant:adhesive in the admixture, and preferably in a ratio between about 0.5:1 or 4:1, retardant:adhesive. The admixture is present between the webs in coat weights of between about 2 and 30 pounds per ream, and preferably between about 5 and 15 pounds per ream.

Similarly, the adhesive is preferably two-part polyester-isocyanate adhesive and the fire retardant composition is a halogen-synergistic inorganic oxide such as a combination of decabromodiphenyl oxide and antimony trioxide. The fire retardant composition can be successfully incorporated into either or both of the adhesive components, and in preferred embodiments is added in approximately equal amounts by weight to each part. It will be understood, however, that the invention is not limited to these particular fire retardant compositions.

Figure 2:
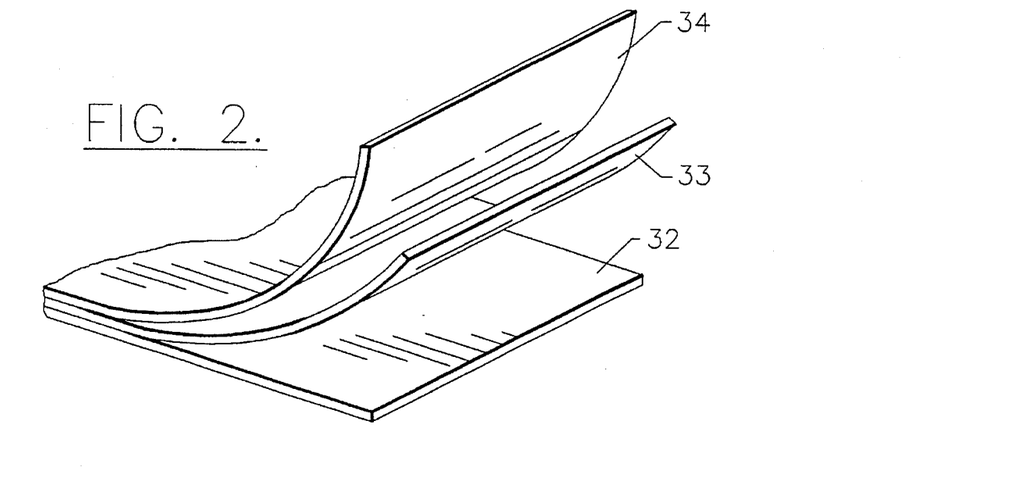
FIG. 2 is a partial perspective view of a laminate according to the present invention showing the various layers hypothetically peeled from one another.

FIGS. 2 through 5 schematically illustrate some of the structures. FIG. 2 schematically illustrates in an exploded view, a metal foil layer 32, preferably aluminum foil, an adhesive layer 33 (schematically shown as a sheet even though it will be understood that it is generally applied in liquid form), and an overlying web 34 of flexible material such as polyethylene.

Figure 3:
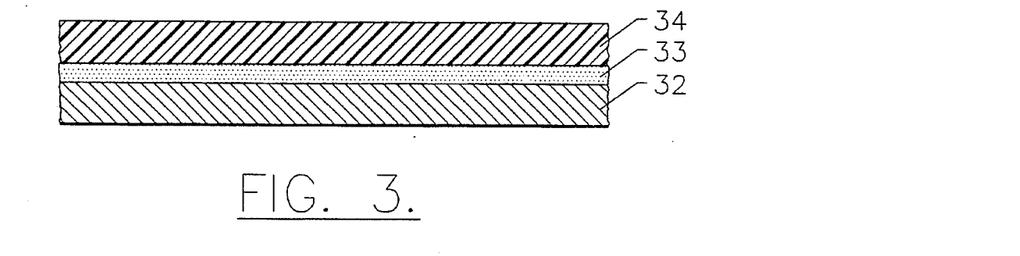
FIG. 3 is a cross-sectional view of one embodiment of the laminate according to the present invention.

FIG. 3 shows a cross-sectional view corresponding to FIG. 2 that includes the aluminum foil 32, the adhesive and fire retardant admixture 33 and the polyethylene web 34.

Figure 4:
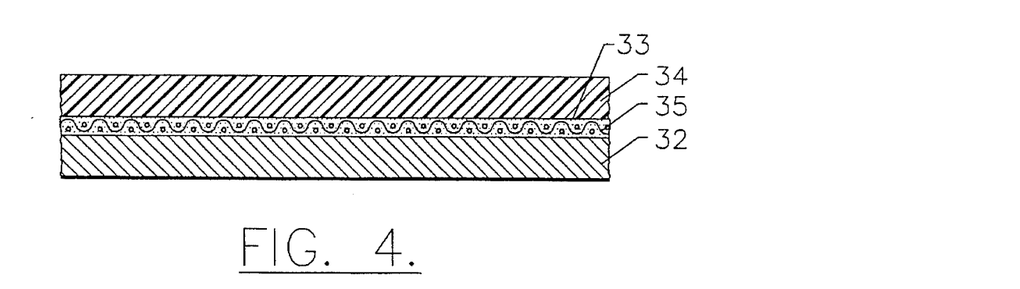
FIG. 4 is a cross-sectional view of a second embodiment of the laminate according to the present invention.

FIG. 4 illustrates an alternative construction which further includes the fiberglass scrim 35.

Figure 5:
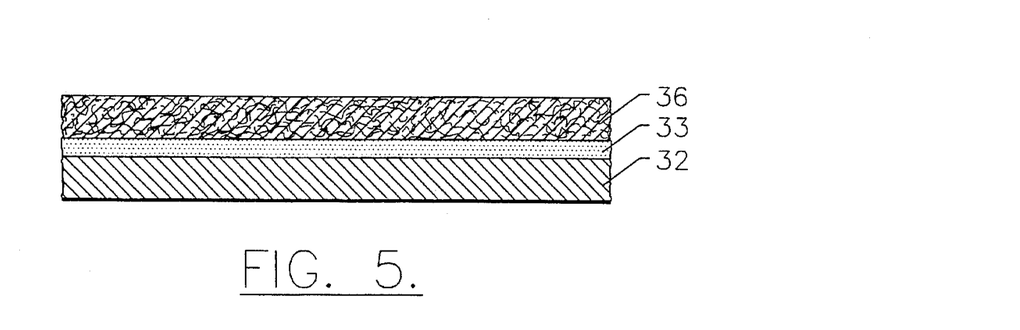
FIG. 5 is a cross-sectional view of a third embodiment merit of the laminate according to the present invention.

Finally, FIG. 5 illustrates a cross section of an embodiment in which the foil 32 is overlaid with a cloth 36 with the adhesive admixture 33 therebetween.

The following examples further illustrate the invention.

EXAMPLE 1

A substantially solvent free two part polyester and isocyanate adhesive was obtained from Lord Corporation (2000

West Grandview Boulevard, Erie, Pa., 16509) under the trade designation Tycel 7975/7276. The two-part adhesive system was modified with a fire retardant (FR) mixture of decabromodiphenyl oxide and antimony trioxide. A high shear mixer dispersed the FR powder into the adhesive. A typical batch was about two gallons and was mixed for ten minutes. The FR/adhesive ratio was 1.15:1 (parts by weight) based upon both adhesive components: polyester-polyol and isocyanate. The components were broken down as follows.

| Component A | | Component B | |
| --- | --- | --- | --- |
| Tycel 7975 | 100 parts | Tycel 7276 | 58.8 parts |
| Decabromodiphenyl oxide | 86.3 parts | Decabromodiphenyl oxide | 50.7 parts |
| Antimony Trioxide | 28.7 parts | Antimony Oxide | 16.9 parts |
| | 215 | | 126.4 |

Typical initial viscosities of a blended mixture at room temperature were in the 20,000–30,000 centipoise per second (cps) range. Pot life was generally estimated at 10–15 minutes at room temperature.

EXAMPLE 2

A 65 inch Busch laminator of an arrangement similar to that illustrated in FIG. 1 was utilized to apply the adhesive admixture of Example 1 to a web in accordance with the present invention. The machine included a three-roll adhesive metering train, primary and a secondary unwind rolls, a heated nip, a chill roll and a rewind. A third unwind for a 4×4 fiberglass scrim was set up behind the secondary unwind which was utilized for the aluminum foil. In order to properly establish coat weights, only component A was used for startup. The results of the startup tests and the trials with both A and B components are set forth in Table 1. The substrates for the trial were 0.0033 inch aluminum foil, 0.015 inch LDPE, and 4×4 fiberglass scrim. Each roll width was 43.5 inches. The adhesive was applied to the LDPE web, while the aluminum foil and scrim were united with the polyethylene at the nip.

In the trial, a useful parameter for properly controlling the coat weight was the gap between the metering rolls (corresponding to rolls 20 and 21 in FIG. 1), and the differential speed of the second metering roll 21 expressed as a-percent of line speed. For the entire trial, the speed of roll 20 was too slow to measure, while the speed of rolls 22 and 23 were the same as line speed. The initial adhesive component temperature was about 35°–40° C. due to the high shear mixing of the fire retardant composition into the adhesive components. The hose that dispersed the admixture to the rollers was initially set at 180° F., while the metering rolls and nip rolls, 25 and 26, were set to 120° F.

TABLE 1

| Test No. | Metering Speed As % of Line | Line Speed | Observation & Comments |
| --- | --- | --- | --- |
| 1 | 14 | 65 | Coat Weight - 3#/R |
| 2 | 26 | 65 | Coat Weight - 5#/R |
| 3 | 35 | 66 | Coat Weight - 24#/R |
| 4 | 35 | 63 | Lamination good on wall side, baggy on operator; coat weight - 20#/R |
| 5 | 18 | 65 | Wallside okay; operation poor |
| 6 | 18 | 205 | Appearance very good |
| | | 260 | Aluminum foil tear, wall side |

TABLE 1-continued

| Test No. | Metering Speed As % of Line | Line Speed | Observation & Comments |
| --- | --- | --- | --- |
| 7 | 18 | 303 | Very good cell resolution; coat weight - 5#/R |
| 8 | 22 | 303 | Running okay |

TABLE 1-continued

| Test No. | Metering Speed As % of Line | Line Speed | Observation & Comments |
| --- | --- | --- | --- |
| 9 | 22 | 416 | Coat weight - 8.4#/R |

Table 1 demonstrates the success of a production scale trial as well as the feasibility of making a scrim-reinforced lamination on a production size solventless laminator at adhesive coat weights of 8 to 10 pounds per ream (#/R).

The resulting laminates were tested for peel strength, tensile strength, dimensional stability, burn testing and water resistance, both in the initially formed state and after 4 weeks. The tensile test was ASTM Standard No. D828, and water resistance was measured by submerging the product for various periods, usually one day to one week, at room temperature.

In order to determine the bond strength of the laminated product, samples were tested in the following fashion. Laminated samples were cut into one-inch by nine-inch samples, preferably taken in groups of three from the edge, the center, and the edge side of the laminate. One end of each sample is then separated for a distance of approximately one inch by either soaking one edge in a solvent or by heating it slightly, such as with a bunsen burner. The separated portions, which are still attached to a intact laminate, are then attached to a clamp. The motor is turned on and pulls on the sample until it totally pulls the sample apart or until one substrate tears off. The motor is gauged to measure the force exerted to the nearest 0.01 pounds. Using this test, a bond is considered destructible when one substrate starts to tear somewhere other than on its edge. If a substrate tears directly at the edge of the sample, however, it is probably the result of a poor cut and not a superior bond.

Using this test, the bond strength of the samples of the present invention was very strong; strong enough that the peel test could not be carried out because the laminate destructed as soon as a peel was started. Thus, the laminate showed excellent dimensional stability in both the machine and cross machine directions.

The burning characteristics of the laminates of the invention were examined using a vertical burn test. In this test, three-inch by nine-inch samples of the material, with the longer direction taken parallel to the machine direction, are clamped on a vertical test stand. The height of the sample is set so that when a bunsen burner is adjusted to produce a flame with a one and one-half inch. height, half of the one-and one-half inch-flame will be touching the sample. The top of the resulting flame is marked at its maximum height. The total flame height is measured and recorded, as is the maximum height of the char that results. For more accurate results, five samples of an identical laminate are tested to obtain an average result.

This vertical burn test showed an average char of 6.3 inches and average flame 7.75 inches for the green product, and an average char length of 4.6 inches and average flame length of 8.2 inches after four weeks. This compares favorably with typical control results, which normally range between 7 and 9 inches, respectively.

The average tensile strength of the green laminate was 36.6 (MD) and 33.5 (CD), and 33.0 (MD) and 33.9 (CD) after four weeks.

The resistance of the bond to water is shown in the following table, where 10 is the highest possible value:

TABLE 2

| Bond value | "Green" | After 4 weeks |
| --- | --- | --- |
| Initial | 10 | 10 |
| After 24 hours in water | 8 | 9 |
| After 1 week in water | 7–8 | 8 |

This example demonstrates that the method of the invention produces stable, fire-retardant laminates having the required properties for being successfully incorporated into building structure.

EXAMPLE 3

A procedure similar to Example 1 was repeated using solvent free adhesive systems from two other Suppliers, Morton International (1275 Lake Avenue, Woodstock, Ill., 60098); and Valspar Corporation (Packaging Coatings Group, 2000 Westhall Street, Pittsburgh, Pa., 15233); form an admixture of adhesive and fire retardant composition. Laminates were formed from these adhesives in a manner similar to that described in Example 2. The results of tests carried out on these samples are shown in Table 3.

TABLE 3

| LAMINATE | GREEN T-PEEL | 1 WK RT T-PEEL | 4 WK RT T-PEEL | 1 WK 120F. T-PEEL | TENSILE MD/CD | H2O RESISTANCE BFR/24 HR/2 WK | VERTICAL BURN CHAR/FLM(¹) | DIM. STABILITY MD/CD | COAT WEIGHTS |
|---|---|---|---|---|---|---|---|---|---|
| 100% SOLIDS SYSTEMS | | | | | | | | | |
| Morton 216 (100 g) and C75 (50 g) with 115 g FR | | | | | | | | | |
| 2 | .3 | 1.2 | 1.2 | 1.9(*) | 35.7/34.1 | 8/8/8 | 2.3/3.7 | 0/0 | 8.5–12 |
| 3 | .9 | 0(*) | 0(*) | 0(***) | 54.8/45.5 | 10/9/9 | 6.7/8.8 | 0/1.6 | |
| 4 | .2 | 0(*) | 0(*) | 0(***) | 18.5/18.7 | 10/9/9 | 7.9/9.0 | 1.6/3.1 | |
| 5 | .3 | 2.5(*) | 2.5(*) | 0(***) | 21.2/20.9 | 10/9/9 | 4.8/7.0(++) | 0/0 | |
| 6 | .5 | 0(*) | 0(*) | 0(***) | 32.2/29.1 | 10/9/9 | 2.8/3.6 | 0/0 | |
| 9 | .3 | 2.7(*) | 2.9(*) | 0(***) | 136/116 | 9/8/9 | 2.1/3.2 | 0/0 | |
| 10 | .2 | 1.9(*) | 1.4(*) | 1.8(*) | 60.2/74.1 | 7/7/5 | 1.6/2.3 | 0/0 | |
| 11 | 1.6 | 1.6 | 1.6 | 2.1 | 103/85.5 | 8/7/7 | .75/0 | | |
| 100% SOLIDS SYSTEMS | | | | | | | | | |
| Lord 7975 (100 g) and 7276 (100 g) with 115 g FR | | | | | | | | | |
| 2 | 1.3 | 0(*) | 0(*) | 0(***) | 40.1/38.3 | 10/9/8 | 2.3/4.8 | 0/0 | 8.5–12 |
| 3 | .9(*) | 0(*) | 0(*) | 0(***) | 37.1/36.6 | 10/9/9 | 4.8/8.1 | 4.7/4.7 | |
| 4 | 1.0(*) | 0(*) | 0(*) | 0(***) | 25.1/25.4 | 10/10/9 | 3.8/5.6 | 0/0 | |
| 5 | .3 | 1.1(***) | 1.4(*) | 1.5(***) | 25.5/15.1 | 10/8/8 | 5.8/9(++) | 0/0 | |
| 6 | 1.2 | 3.1(*) | 3.2(*) | 0(***) | 33.7/33.1 | 10/9/9 | 2.7/3.7 | 0/0 | |
| 9 | .3 | 1.4(***) | 1.8(*) | 2.1(**) | 152/116 | 9/4/4 | 1.3/3.5 | | |
| 10 | .3 | 1.4(*) | 1.4(*) | 1.5(***) | 56.4/87.3 | 9/3/3 | 2.1/0 | | |
| 100% SOLIDS SYSTEMS | | | | | | | | | |
| Valspar 810X327 (100 g) and 910X599 (60 g) with 115 g FR | | | | | | | | | |
| 2 | .3 | 1.1(*) | 1.3(*) | 0(***) | 30.9/26.1 | 10/8/7 | 1.8/2.3 | 0/0 | 8.5–12 |
| 3 | .4 | 0(*) | 0(*) | 0(***) | 48.6/35.7 | 10/9/8 | 6.3/7.9 | 0/0 | |
| 4 | .6 | 1.2(*) | 1.6(*) | 1.4(***) | 24.8/18.1 | 10/6/7 | 8.8/9(+++) | 4.7/1.6 | |
| 5 | .5 | 2.0(*) | 0(*) | 0(***) | 25.3/22.3 | 10/9/9 | 4.0/6.9 | 0/0 | |
| 6 | .5 | 0(*) | 0(*) | 0(***) | 30.4/29.2 | 10/10/9 | 2.3/3.5 | 0/0 | |
| 8 | .3 | 0(*) | 0(*) | 0(***) | 40.7/37.7 | 10/9/9 | 1.9/2.7 | 0/0 | |
| 9 | .2 | 1.2 | 1.5(*) | 1.7(*) | 181/86.2 | 9/8/8 | 1.5/2.6 | 0/0 | |
| 10 | .2 | 1.3(*) | 1.7(*) | 1.3(***) | 56.4/87.3 | 9/7/5 | 1.5/0 | 0/0 | |
| 11 | 1.4 | 1.5 | 1.6 | 2.1 | 93.2/84.9 | 8/7/7 | 1.1/0 | | |

1 (*) represents destructibles
2 (+) represents quantity of sample burns exceeding 9"
3 "Laminate" designates various constructions within the Lamotite product line. All constructions tested are the result of laboratory draw-downs.

In the drawings and specification, there have been disclosed typical preferred embodiments of the invention and, although specific terms have been employed, they have been used in a generic and descriptive sense only and not for purposes of limitation, the scope of the invention being set forth in the following claims.

That which is claimed is:

1. A fire retardant laminate structure that is particularly suitable as moisture barrier thermal insulation in buildings, said laminate structure comprising:

a first web of a flexible moisture barrier material;

a second web of flexible material overlying said first web; and an admixture of an uncured substantially solvent-free adhesive and a fire retardant composition between said first and second webs for adhesively joining said webs when the adhesive in said adhesive admixture is cured and set;

said admixture having a viscosity of between about 20,000 and 30,000 centipoise per second and being present in an amount of between about 5 and 15 pounds per ream; and said fire retardant composition being present in said admixture in a ratio by weight of between about 0.5:1 and 4:1, retardant:adhesive.

2. A fire retardant laminate structure according to claim 1 wherein said admixture of a substantially solvent-free adhesive and a fire retardant composition comprises an admixture of a polyester-isocyanate adhesive and the fire retardant composition.

3. A fire retardant laminate structure according to claim 1 wherein said admixture of said adhesive and said fire retardant composition comprises an admixture of said adhesive and a halogen-synergistic inorganic oxide.

4. A fire retardant laminate structure according to claim 1 wherein said admixture of said adhesive and said halogen-synergistic inorganic oxide comprises an admixture of said adhesive, decabromodiphenyl oxide, and antimony trioxide.

5. A fire retardant laminate structure according to claim 1 and further comprising a reinforcing scrim between said first and second webs.

6. A fire retardant laminate structure according to claim 5 wherein said scrim-comprises a fiberglass scrim.

7. A fire retardant laminate structure according to claim 1 wherein said first web comprises a polymer and said second web comprises a metal foil.

8. A fire retardant laminate structure according to claim 5 wherein said first web comprises low density polyethylene and said second web comprises aluminum foil.

9. A fire retardant laminate structure according to claim 1 wherein said first web comprises cloth and said second web comprises a metal foil.

10. A fire retardant laminate structure that is particularly suitable as a moisture barrier thermal insulation in buildings, said laminate structure comprising:

a first web of polyethylene for providing a flexible moisture barrier material;

an second web of flexible metal foil overlying said first web;

a reinforcing fabric scrim between said first and second webs;

an admixture of an uncured substantially solvent-free adhesive and a fire retardant composition between said first and second webs for adhesively joining said webs and said scrim when the adhesive in said adhesive admixture is cured and set;

said admixture having a viscosity of between about 20,000 and 30,000 centipoise per second and being present in a coat weight of between about 5 and 15 pounds per ream; and said fire retardant composition being present in said admixture in a ratio by weight of between about 0.5:1 and 4:1, retardant:adhesive.

\* \* \* \* \*

UNITED STATES PATENT AND TRADEMARK OFFICE
CERTIFICATE OF CORRECTION

PATENT NO. : 5,486,408
DATED : January 23, 1996
INVENTOR(S) : Sentendrey

It is certified that error appears in the above-identified patent and that said Letters Patent is hereby corrected as shown below:

Columns 11 and 12, line 3, "BFR/24 HR/2 WK" should be --BFR/24 HR/1 WK--.

Signed and Sealed this

Eighteenth Day of June, 1996

Attest:

BRUCE LEHMAN

*Attesting Officer*          *Commissioner of Patents and Trademarks*